June 30, 1970  H. L. HARRIS  3,518,542
BRIDGEWIRE CURRENT DETECTOR
Filed March 18, 1968
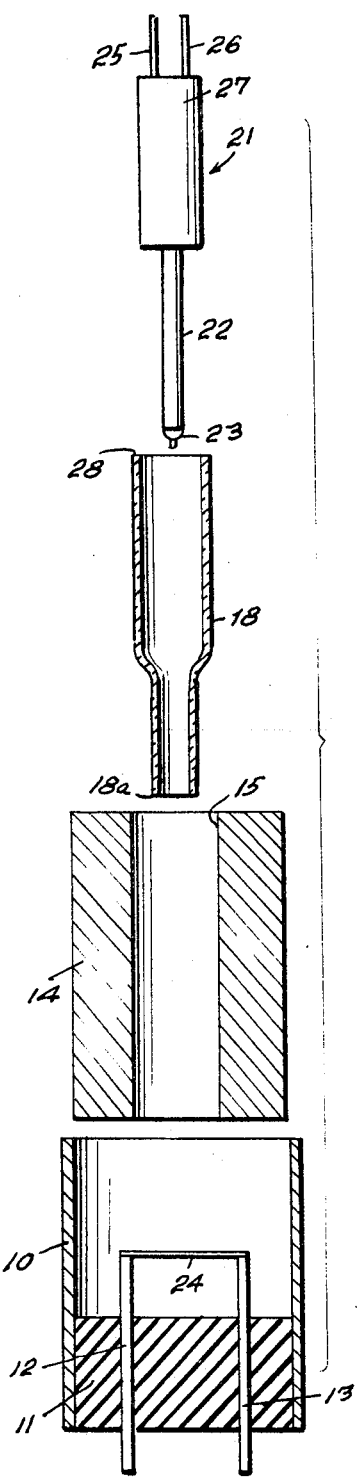
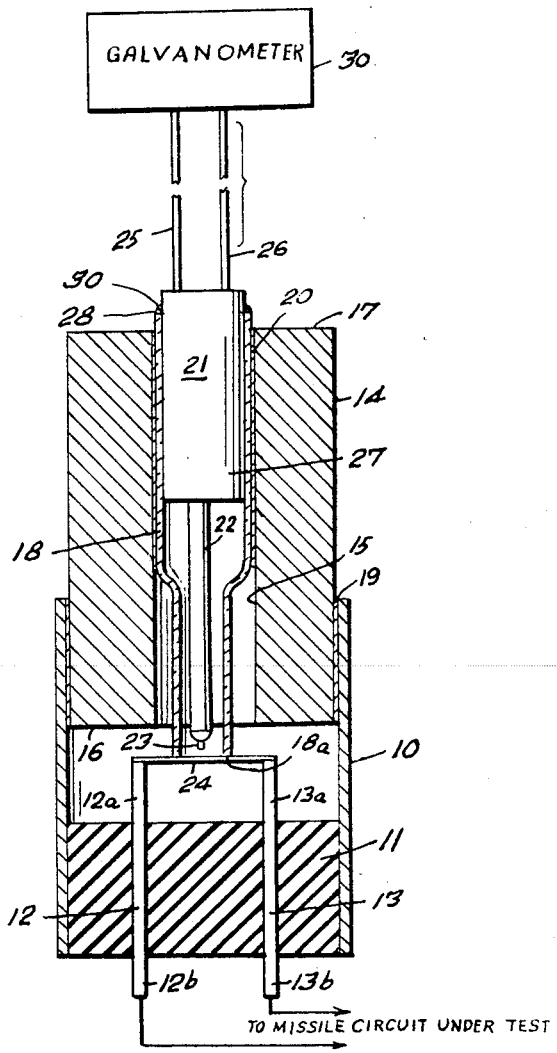
TO MISSILE CIRCUIT UNDER TEST
INVENTOR,
Hunter L. Harris
BY: Harry M. Saragovitz,
Edward J. Kelly &
R. P. Gibson  ATTORNEYS.

United States Patent Office 3,518,542
Patented June 30, 1970

3,518,542
BRIDGEWIRE CURRENT DETECTOR
Hunter L. Harris, Las Cruces, N. Mex., assignor to the United States of America as represented by the Secretary of the Army
Filed Mar. 18, 1968, Ser. No. 713,694
Int. Cl. G01r 5/26
U.S. Cl. 324—106     2 Claims

ABSTRACT OF THE DISCLOSURE

A bridgewire current detector of great stability and high sensitivity for use in conducting electromagnetic radiation hazard tests on missile systems utilizing electro-explosive initiators.

---

The invention described herein may be manufactured, used, and licensed by or for the Government for governmental purposes without the payment to me of any royalty thereon.

The bridgewire current detector of the invention relates to the instrumentation of materiel which incorporates electro-explosive devices. The electro-explosive devices initiate or perform various functions when voltage is applied. The purpose of the instrumentation is to accomplish tests which disclose the degree of susceptibility of these electro-explosive devices to inadvertant activation when exposed to electromagnetic radiation. The susceptibility is expressed in terms of magnitudes of current induced in the bridgewire of the electro-explosive device by electromagnetic radiation at various frequencies. In particular, electromagnetic radiation hazard tests must be made on missile systems utilizing electro-explosive initiators which, by the way of example, activate motors, warheads, switches, break-away sections and gas generators of missiles. Prior detector means which have been employed in the aforementioned tests are expensive, require elaborate equipment, require trained personnel, and possess less sensitivity and stability than the bridgewire current detector of the invention.

It is accordingly a primary object of the present invention to provide a simple and high reliability bridgewire current detector.

Another object of the invention is a new and novel bridgewire current detector that is simple to install, requiring no elaborate equipment or special training of personnel.

Another object of the invention is a new and novel bridgewire current detector of high reliability wherein the bridgewire and thermocouple are maintained in a predetermined fixed relationship to each other.

A further object of the invention is a bridgewire current detector of stable electrical characteristics and reliability.

The invention will be more fully understood and its objects and advantages further appreciated by referring to the following detailed description taken in conjunction with the accompanying drawing in the several figures of which like numerals identify like elements and in which:

FIG. 1 is a longitudinal cross-sectional view of the invention; and
FIG. 2 is an exploded view of the assembly shown in FIG. 1.

With continued reference to the drawings, FIG. 1 illustrates a preferred embodiment of the invention wherein numeral 10 indicates a hollow cylindrical member 10 closed at one end by an insulator 11 which holds in spaced relationship two electrically conductive support wires 12 and 13. Ends 12a and 13a of the support wires extend into the cylindrical member 10 and support therebetween a bridgewire 24 which heats when induced current due to the electromagnetic radiation field in the environment of the missile circuitry employing an electro-explosive initiator passes therethrough. The ends 12b and 13b of the support wires which extend exteriorly of the cylindrical member 10 are connected to the circuit being tested for current induced therein by electromagnetic radiation. In conducting the test, electro-explosive initiators of known characteristics provided with inert explosives are used.

In one form the electro-explosive initiator is identical to cylindrical member 10 and its associated parts as described above with the exception that the bridgewire is provided with a pyrotechnique and the cylindrical member filled with an explosive. In use the support wires of the electro-explosive initiator are connected to an electrical activating circuit.

A cylindrical plastic member 14 provided with a longitudinal bore 15 is inserted in cylindrical member 10 so that an end 16 is spaced from bridgewire 24 and is retained in this position by means of cement 19 bonding plastic member 14 to the interior wall of cylindrical member 10. The opposite end 17 is positioned exteriorly of cylindrical member 10. A glass tube 18, having one section tapered, for supporting a microminiature thermocouple 21 is inserted in longitudinal bore 15 of plastic member 14 until the end 18a of the tapered section of glass tube 18 is in firm contact with bridgewire 24 whereby bridgewire 24 is firmly held in place thereby reducing movement of the bridgewire when heated and contributing to a high degree of calibration and stabilization. Glass tube 18 is maintained in this position by means of cement as indicated by reference numeral 20.

The microminiature thermocouple 21 is a commercial item consisting of a probe comprising a .014″ O.D. x ½″ long metallic tube 22 which houses a pair of ceramic tubes, not shown, containing the thermocouple wires. The thermocouple junction 23 is supported at one end of tube 22, the opposite end being provided with the ceramic base 27 housing the lead wires 25 and 26 to which the thermocouple wires are connected.

Microminiature thermocouple 21 is inserted in glass tube 18 until thermocouple junction 23 contacts the bridgeware 24. Then a small amount of cement 30 is placed around the end 28 of glass tube 18 for the purpose of cementing the ceramic base 27 to glass tube 18. An ohmmeter is connected between, for example, lead 25 of the microminiature thermocouple 21 and the end 12b of support wire 12 and while the cement 27 is drying the thermocouple 21 is gently withdrawn from glass tube 18 until the contact between thermocouple junction 23 and bridgewire 24 is just barely broken as indicated by the ohmmeter. Thus the thermocouple junction 23 is positioned in the immediate vicinity of bridgewire 24 whereby the sensitivity of the detector of the invention is greatly enhanced. Prior devices used for measuring induced current due to electromagnetic radiation, as aforementioned, have sensitivities of 5% to 10% of no fire level with time responses made between 2 and 20 milliseconds. The no fire level referred to is the safe level of current which when passed through the bridgewire will not activate the electro-explosive initiator. For example, a 10% no fire level on a one ampere no fire electro-explosive initiator would be 100 ma. In contrast to the performance of said prior devices, the instant bridgewire current detector has a sensitivity as low as 1% of the no fire level and response of 12 milliseconds.

In practical application, the ends 12b and 13b of support wires 12 and 13 are connected to the missile circuit to be tested and a galvanometer 31 is connected to the miniature thermocouple leads 25 and 26.

Although a specific embodiment of the invention has been illustrated and described, it will be understood that this is but illustrative and that various modifications may be made therein without departing from the spirit of the invention and the scope of the claims.

What is claimed is:

1. A bridgewire current detector of high sensitivity and stability for use in electromagnetic radiation hazard tests to determine the amount of current induced by electromagnetic radiation in missile electrical systems employing electro-explosive initiators comprising, a cylindrical housing supporting in insulating relationship therein and transversely of the longitudinal axis thereof a bridgewire provided with leads for connecting to said electrical circuits, a tube of electrical insulating material and having an end affixed in coaxial relationship in said housing in contact with said bridgewire for stressing the bridgewire and preventing movement of said bridgewire when current passes therethrough, a thermocouple, provided with two leads for connecting to a current indicating instrument, affixed in said tube along the longitudinal axis thereof and having a thermocouple junction positioned at right angles to and spaced an infinitesimal distance from said bridgewire whereby great sensitivity is obtained.

2. A bridgewire current detector of high sensitivity and stability for use in electromagnetic radiation hazard tests to determine the amount of current induced by electromagnetic radiation in missile electrical systems employing electro-explosive initiators comprising, a hollow cylindrical member, an insulator affixed in one end of said hollow cylindrical member providing closure means therefor, a pair of spaced wires supported in said insulator, said pair of spaced wires extending through said insulator whereby a pair of terminals are formed interiorly of said hollow cylindrical member and a pair of terminals are formed externally of said hollow cylindrical member, a bridgewire connected across said terminals formed interiorly of said hollow cylindrical member, said terminal formed externally of said hollow cylindrical member adapted to be connected to said electrical circuits, a plastic cylindrical member provided with a longitudinal bore affixed in said hollow cylindrical member having one end spaced from said bridgewire and the opposite end extended exteriorly of said hollow cylindrical member, a glass tube formed with a reduced section affixed in said bore so that the end of said reduced section is in firm contact with said bridgewire whereby movement of said bridgewire due to current flowing therethrough is prevented, and a microminiature thermocouple probe supporting at one end thereof the thermocouple junction and at the opposite end a pair of leads adapted to connect the thermocoule to a current indicating instrument, said microminiature thermocouple probe affixed in said glass tube so that the thermocouple junction is spaced in infinitesimal distance from said bridgewire whereby the sensitivity of said detector is greatly enhanced.

References Cited

UNITED STATES PATENTS 2,659,864 11/1953 Rich et al. _____ 324—109
3,441,855  4/1969 Aida et al. _____ 324—106

RUDOLPH V. ROLINEC, Primary Examiner

E. F. KARLSEN, Assistant Examiner